United States Patent
Fang (10) Patent No.: US 9,115,215 B2
(45) Date of Patent: Aug. 25, 2015

(54) METHOD FOR COMPLETELY DISSOLVING AND RAPIDLY HYDROLYZING CELLULOSE, AND USES OF SAID METHOD

(75) Inventor: Zhen Fang, Kunming (CH)

(73) Assignee: XISHUANGBANNA TROPICAL BOTANICAL GARDEN, CHINESE ACADEMY OF SCIENCES, Yunnan (CN)

( * ) Notice: Subject to any disclaimer, the term of this patent is extended or adjusted under 35 U.S.C. 154(b) by 931 days.

(21) Appl. No.: 13/259,526

(22) PCT Filed: Aug. 18, 2010

(86) PCT No.: PCT/CN2010/001253
§ 371 (c)(1),
(2), (4) Date: Dec. 6, 2011

(87) PCT Pub. No.: WO2011/094922
PCT Pub. Date: Aug. 11, 2011

(65) Prior Publication Data
US 2012/0067342 A1    Mar. 22, 2012

(30) Foreign Application Priority Data
Feb. 2, 2010  (CN) .......................... 2010 1 0104133

(51) Int. Cl.
*C08B 1/00* (2006.01)
*C08B 15/02* (2006.01)
*C08L 1/02* (2006.01)

(52) U.S. Cl.
CPC .................. *C08B 1/003* (2013.01); *C08B 15/02* (2013.01); *C08L 1/02* (2013.01); *Y02E 50/16* (2013.01)

(58) Field of Classification Search
None
See application file for complete search history.

(56) References Cited

U.S. PATENT DOCUMENTS 8,268,126 B2 *   9/2012   Fang et al. ...................... 162/90

FOREIGN PATENT DOCUMENTS

| CN | 101235095 A * | 8/2008 |
| CN | 101824156 A | 9/2010 |
| WO | WO 2005/017001 A1 | 2/2005 |

OTHER PUBLICATIONS

LV, X. et al. "A New Process to Resource Rice Hull", Transactions of the Chinese Society of Agricultural Engineering, vol. 17, No. 2, Mar. 2001, pp. 132-135. English Abstract.

(Continued)

*Primary Examiner* — Melvin C Mayes
*Assistant Examiner* — Stefanie Cohen
(74) *Attorney, Agent, or Firm* — Merchant & Gould P.C.

(57) ABSTRACT

The invention discloses a method for completely dissolving and rapidly hydrolyzing cellulose, and uses thereof. Cellulose is placed in an acidic aqueous solution with a [$H^+$] concentration of $10^{-7}$~1 M or an alkaline aqueous solution with a [$OH^-$] concentration of $10^{-7}$~1 M as sample A, wherein the volume ratio of solid to liquid is (0.003~1.05):1. The acidic aqueous solution with a [$H^+$] concentration of $10^{-7}$~1 M or the alkaline aqueous solution with a [$OH^-$] concentration of $10^{-7}$~1 M is heated up to 261~352 as sample B. Sample A and sample B obtained from step 1 and step 2 are mixed in a reactor to a concentration of cellulose of 0.1%~35%, the concentration of the mixed solution is adjusted to an acidity of $10^{-7}$~1 M [$H^+$] or an alkalinity of $10^{-7}$~1 M [$OH^-$], and a water density of 587~997 kg/m$^3$, pressure is set at 6~584 MPa. The mixture is rapidly heated up to 261~352 at heating rate of 7.8~14.8 /s, and then cellulose is dissolved completely in 0.8~2 sec and hydrolyzed in 5 sec. Using this technique, it is the first time for achieving complete dissolution and rapid hydrolysis of cellulose at a lower temperature, which not only dramatically reduces the cost of hydrolysis but also improves the safety of production and extends the service life of equipment, thus possessing a good application prospect.

6 Claims, 3 Drawing Sheets

(56) References Cited

OTHER PUBLICATIONS

Ehara, K. et al. "Decomposition behavior of cellulose in supercritical water, subcritical water, and their combined treatments", Japan Wood Research Society, vol. 51, No. 2, Dec. 2005, pp. 148-153.

Nanjing Forestry Institute, Plant Hydrolysis Technology (Ed. In Chinese), Beijing: Agricultural Press, 1961. English Abstract.

Sasaki, M. et al. "Dissolution and Hydrolysis of Cellulose in Subcritical and Supercritical Water", Ind. Eng. Chem. Res., vol. 39, 2000, pp. 2883-2890.

Ogihara, Y. et al. "Direct observation of cellulose dissolution in subcritical and supercritical water over a wide range of water densities (550-1000 $kg/m^3$)", Cellulose, vol. 12, 2005, pp. 595-606.

International Search Report for corresponding International Patent Application No. PCT/CN2010/001253 mailed Dec. 2, 2010.

* cited by examiner

METHOD FOR COMPLETELY DISSOLVING AND RAPIDLY HYDROLYZING CELLULOSE, AND USES OF SAID METHOD

This application is a National Stage Application of PCT/CN2010/001253, filed 18 Aug. 2010, which claims benefit of Serial No. 201010104133.5, filed 2 Feb. 2010 in China and which applications are incorporated herein by reference. To the extent appropriate, a claim of priority is made to each of the above disclosed applications.

FIELD OF THE INVENTION

The invention relates to the technical field of dissolving and hydrolyzing biomass. More particularly, the invention relates to a method for completely dissolving and rapidly hydrolyzing cellulose, and uses thereof.

BACKGROUND OF THE INVENTION

In nature, lignocellulosic biomass, such as wood and grass, is roughly consisted of 50% cellulose, 25% hemicellulose, and 20% lignin. Cellulose can be hydrolyzed into saccharides which are further used for producing cellulosic ethanol through fermentation. Because lignocellulosic biomass is water-insoluble, the current industrial methods for hydrolyzing biomass proceed mainly in a semi-continuous percolating reactor containing 0.4~0.8% dilute aqueous sulphuric acid, at temperature of 180~190 and under pressure of 12~14 atmospheres [see, *Nanjing Forestry Institute. Plant Hydrolysis Technology (Ed. in Chinese). Beijing: Agricultural Press, 1961.*]. Reports about continuous production of sugars in a high-pressure continuous flow reactor were not found.

It is shown in most recent studies that high-pressure hot-water is a weak-polar solvent, presenting both acidic and basic. As a result, it can be used to dissolve biomass, and allow hydrolysis reactions to be performed in a homogeneous phase. It was found by Sasaki et al. that cellulose can be completely dissolved in water at 320 and a water density of more than 1000 kg/m$^3$ [see: *Sasaki M, Fang Z, Fukushima Y, Adschiri T, Arai K. Dissolution and hydrolysis of cellulose in subcritical and supercritical water. Ind. & Eng. Chem. Res. 2000; 39(8):2883-2890.*]. Afterwards, it was further found by Ogihara et al. that the minimum temperature for completely dissolving cellulose at a water density ranging from 550 to 1000 kg/m$^3$ is 320 at a water density of 850 kg/m$^3$. [see: *Ogihara Y, Smith Jr. RL, Inomata H, Arai K. Direct observation of cellulose dissolution in subcritical and supercritical water over a wide range of water densities (550~1000 kg/m3). Cellulose. 2005;12:595~606.*]. The above findings all relate to pure water, and cellulose has a higher dissolving temperature (or pressure) and a lower hydrolysis rate and yield in pure water. On the basis of the above works, the inventor, after studies, found that addition of a minor amount of alkaline salts in pure water allows lignocellulosic biomass such as wood powders to be dissolved completely and to be undergone a homogeneous hydrolysis at 329~367. A Chinese patent was then filed accordingly (application number: 200710141265.3; CN101235095-A).

Because of the restriction of the condition back then, the above patent application does not involve the influence of acidic and extremely weak basic solutions on dissolution of cellulose. Also, how to completely dissolve and rapidly hydrolyze cellulose at a lower reaction temperature using a high-pressure continuous flow reactor is still a technical problem to be further solved.

DISCLOSURE OF THE INVENTION

Concerning the disadvantages in prior art, the object of the invention is to provide a method for completely dissolving and rapidly hydrolyzing cellulose at a lower temperature and pressure, so as to reduce cost of precessing.

Another object of the invention is to provide further applications of the above method for dissolving and rapidly hydrolyzing cellulose in industrial production.

The objects of the invention are achieved by the following technical solutions.

Unless indicated otherwise, all the percentages used in the invention are volume based.

After intensive investigations, the inventor found that complete dissolution and rapid hydrolysis of cellulose can be achieved by the steps below: placing cellulose in an acidic or basic solution before its dissolution and rapid hydrolysis; mixing the mixture with a preheated high-temperature dilute acidic or dilute alkaline solution; and heating up to a certain temperature at a certain heating rate. Based on the above, the following technical solutions are proposed by the inventor:

A method for completely dissolving and rapidly hydrolyzing cellulose, comprising the steps of:

1. placing cellulose in an acidic aqueous solution with a [H$^+$] concentration of 10$^{+7}$~1 M or an alkaline aqueous solution with a [OH$^-$] concentration of 10$^{-7}$~1 M, as sample A, wherein the volume ratio of solid to liquid is (0.003~1.05) : 1;

2. heating the acidic aqueous solution with a [H$^+$] concentration of 10$^{-7}$~1 M or the alkaline aqueous solution with a [OH$^-$] concentration of 10$^{-7}$~1 M up to 261~352 as sample B;

3. mixing sample A and sample B obtained from step 1 and step 2 in a reactor to a cellulose concentration of 0.1%~35%, adjusting the concentration of the mixed solution to an acidity of 10$^{-7}$~1 M [H$^+$] or an alkalinity of 10$^{-7}$~1 M [OH$^-$], and a water density of 587~997 kg/m$^3$, setting pressure at 6~584 MPa, rapidly heating the mixture up to 261~352 at a heating rate of 7.8~14.8 /s, and then completely dissolving and hydrolyzing cellulose in 0.8~2 sec.

Said acidic aqueous solution is an aqueous solution of hydrochloric acid (HCl), nitric acid (HNO$_3$) and sulphuric acid (H$_2$SO$_4$).

Said alkaline aqueous solution is an aqueous solution of sodium hydroxide (NaOH), potassium hydroxide (KOH) and calcium hydroxide [Ca(OH)$_2$].

Preferably, the acidic aqueous solution is aqueous HCl solution.

Preferably, the alkaline aqueous solution is aqueous NaOH solution.

The above method for completely dissolving and rapidly hydrolyzing cellulose can be used in production of ethanol. In other words, cellulose can be decomposed into saccharides (glucose and oligosaccharides) by continuously heating up to 355 and then cooling down to room temperature naturally after the complete dissolution of cellulose. Those saccharides can be used for producing ethanol through fermentation.

Compared with prior art, the invention has the advantages listed as follows:

1. It is the first time for achieving complete dissolution and rapid hydrolysis of cellulose at a lower temperature, which not only dramatically reduces the cost of production but also improves the safety of production and extends the service life of equipments.

2. The subsequent hydrolysis reaction can be carried out in a homogeneous condition, which facilitates hydrolysis reactions and suppresses pyrolysis reactions. The total dissolution period is shorter than 0.8~2 sec, and the hydrolysis period is less than 5 sec.

3. Solubilized cellulose may be applied in a low temperature, high-pressure flowing-type reactor, which further reduces the cost of production. And saccharides, and other biofuels and value-added products may also be produced through the continuous processing.
4. Addition of dilute acids and dilute bases (which are much cheaper) may both lower temperature for complete dissolution and accelerate hydrolysis.
5. The saccharides produced by hydrolysis have a higher purity and concentration than those produced by lignocellulosic biomass such as wood powders. Only glucose and its oligosaccharides without pentoses or their oligosaccharides are contained in the saccharides produced by hydrolysis.

DETAILED DESCRIPTION OF THE PREFERRED EMBODIMENTS

The present invention is further explained and illustrated in combination with the Figures and tests which are not to be construed to limit the scope of the invention.

Examples of Tests

In order to understand the substantial matter of the invention more clearly, tests for completely dissolving cellulose powders are used for demonstrating the technical effect of the invention and its application prospect in industrial production.

Figure 1:
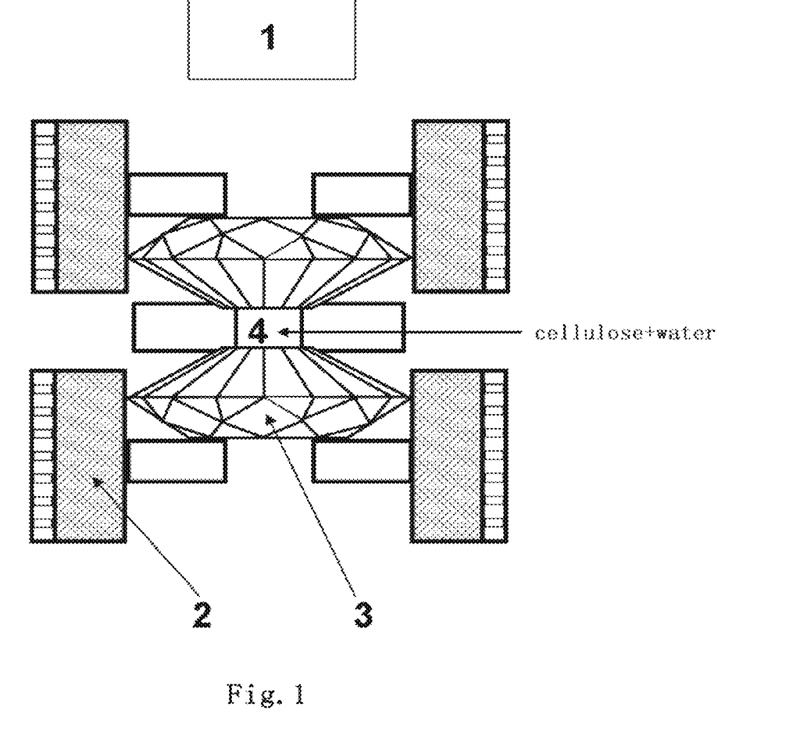
FIG. 1. The schematic structural diagram of the micro-optical diamond reactor used in the experiments of the invention.

As shown in FIG. 1, the experimental equipment is a micro-optical diamond reactor (Diamond Anvil Cell; DAC). This reactor can be used to heat water and cellulose in the reaction chamber up to a high temperature rapidly, and allows the observation of the dissolution process of cellulose in water. A small hole with a diameter of 500 μm is drilled in an stainless steel plate with a thickness of 250 μm, so as to form a reaction chamber 4 with a volume of 50 nL. When water and cellulose are added into the reaction chamber 4, the hole is pressed by the two diamonds located lower and upper, so as to seal this hole and generate pressure. If the two diamonds are loosed, nitrogen may enter into the hole and generate gas bubbles. By adjusting the size of the gas bubbles, different water densities (=mass of water/volume of reactor, kg/m$^3$) can be obtained. The water in the reaction chamber is heated rapidly by two electronic heaters 2, and at the same time, observed and recorded under an optical microscope 1 (110× magnification). After reaction, chemical structure of the products remained on the surface of the diamonds is analyzed under an infrared microscope. Because volume of the reaction chamber is const, pressure can be calculated by a state equation of water by knowing water density and reactor temperature (measured by a thermocouple).

Cellulose powders (5 mL) are weighted, and aqueous solutions with a [H$^+$] or [OH$^-$] concentration of $10^{-7}$~1 M (5 mL each) are prepared and ready for use.

Test 1 (Comparative Test 1)

Figure 2:
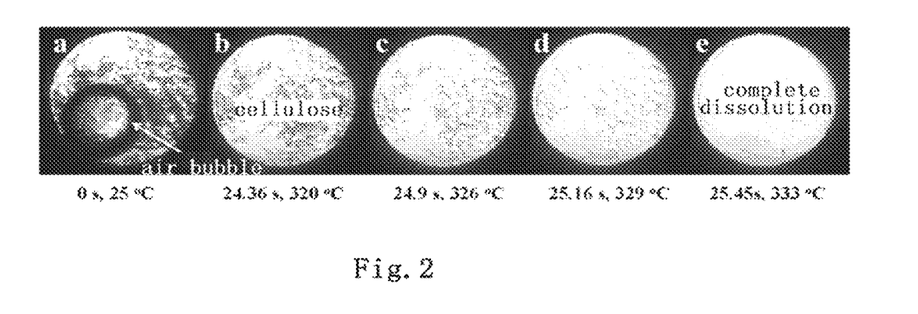
FIG. 2. The general optical microscope photographs of the dissolution process of cellulose in pure water (heating rate=12.1° C./s, water density=887 kg/m$^3$)

Cellulose powders and pure water were added into the reactor (DAC), wherein the concentration of cellulose was 30%, heating rate was set to 12.1/s, and water density was 887 kg/m$^3$;

As shown in FIG. 2:
a: before heated, cellulose was suspended in water with gas bubbles;
b: after heated for 24.36 s, temperature reached 320, and cellulose became transparent and started to dissolve (gas bubbles disappeared at 180);
c: after heated for 24.9 s, temperature reached 326, and more cellulose dissolved;
d: after heated for 25.16 s, temperature reached 329, and most cellulose dissolved;
e: after heated for 25.45 s, temperature further rose up to 333 (260 MPa), and all cellulose dissolved with a dissolution period of 1.09 s.

Figure 5:
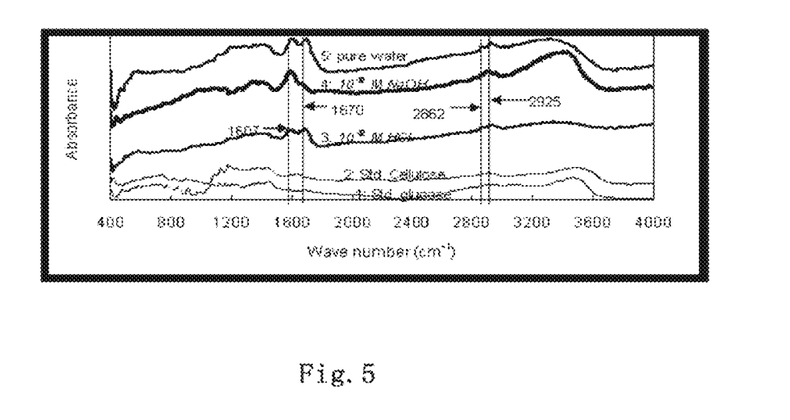
FIG. 5. The infrared spectrum absorption curves of the experimental products.

After reactions, the reactor was opened and a saccharide-like material was seen on the surface of the diamonds. It was shown by an infrared analysis that this material was hydrolyzed and possessed the features of glucose (FIG. 5, curve 5 vs. curves 1 and 2).

Experimental conclusion: rapid heating allows the complete dissolution of cellulose in pure water.

Test 2

Cellulose powders and an acidic HCl solution were added into DAC reactor, wherein the concentration of HCl in the resulting mixed solution was $10^{-2}$ M, the concentration of cellulose was 25%, heating rate was set to 11.3/s, and water density was 958 kg/m$^3$.

Figure 3:
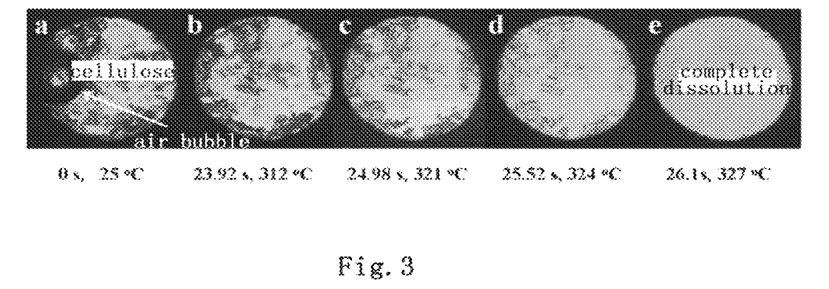
FIG. 3. The general optical microscope photographs showing the complete dissolution process of cellulose in a $10^{-2}$ M HCl solution when an acidic solution is added (heating rate=11.3° C./s, water density=958 kg/m$^3$)

As shown in FIG. 3:
a: before heated, cellulose was suspended in the acidic solution with gas bubbles;
b: after heated for 23.92 s, temperature reached 312, and cellulose had no change (gas bubbles disappeared at 101);
c: after heated for 24.98 s, temperature reached 321, and cellulose became transparent and started to dissolve;
d: after heated for 25.52 s, temperature reached 324, and more cellulose dissolved;
e: after heated for 26.1 s, temperature further rose up to 327 (433 MPa), and all cellulose dissolved with a dissolution period of 1.12 s. Heating was continued until temperature reached 355.

After reactions, the reactor was opened and a saccharide-like material was seen on the surface of the diamonds. It was shown by an infrared analysis that this material was hydrolyzed and possessed the features of glucose (FIG. 5, curve 3 vs. curves 1 and 2).

Experimental conclusion: when rapidly heated up to 355, cellulose can be completely dissolved and hydrolyzed in an acidic solution of $10^{-2}$ M HCl at a lower temperature.

Test 3

Cellulose powders and an alkaline NaOH solution were added into DAC reactor, wherein the concentration of NaOH in the resulting mixed solution was $10^{-2}$ M, the concentration of cellulose was 32%, heating rate was set to 13.4/s, and water density was 848 kg/m$^3$.

Figure 4:
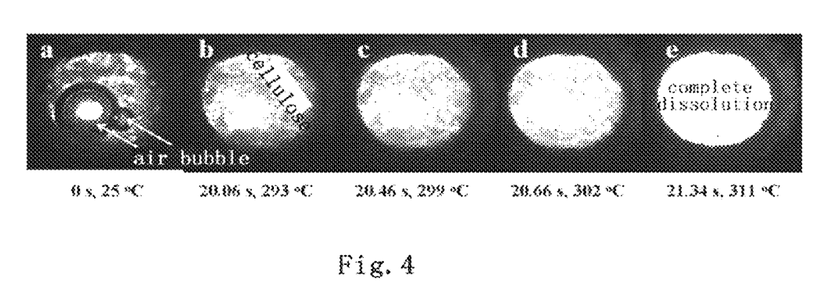
FIG. 4. The general optical microscope photographs showing the complete dissolution process of cellulose in a $10^{-2}$ M NaOH solution when an alkaline solution is added (heating rate=13.4° C./s, water density=848 kg/m$^3$)

As shown in FIG. 4:
a: before heated, cellulose was suspended in the alkaline solution with gas bubbles;
b: after heated for 20.06 s, temperature reached 293, and the solution became yellow (gas bubbles disappeared at 214);
c: after heated for 20.46 s, temperature reached 299, and cellulose became transparent and started to dissolve;
d: after heated for 20.66 s, temperature reached 302, and more cellulose dissolved;
e: after heated for 21.34 s, temperature further rose up to 311 (152 MPa), and all cellulose dissolved with a dissolving period of 0.88 s. Heating was continued until temperature reached 355.

After reactions, the reactor was opened and a saccharide-like material was seen on the surface of the diamonds. It was shown by an infrared analysis that this material was hydrolyzed and possessed the features of glucose (FIG. 5, curve 4 vs. curves 1 and 2).

Experimental conclusion: when rapidly heated up to 355, cellulose can be completely dissolved and hydrolyzed in an alkaline solution of $10^{-2}$ M NaOH at a lower temperature. More Experiments are Conducted:

EXAMPLE 1

Pure Water

Cellulose was added to pure water to form a cellulose material, and pure water was heated up to 349. The pure water and the cellulose material were mixed and placed into a reactor. After mixed, the concentration of cellulose was 20%, water density was set to 594 kg/m$^3$, rapid heating was carried out until temperature reached 349; heating rate was 10.4/s until temperature reached 326 (12 MPa), and cellulose was dissolved completely in 1.05 s. Cellulose was hydrolyzed into oligosaccharides and glucose.

EXAMPLE 2

Pure Water

Example 1 was repeated, except that: pure water was heated up to 319; after mixed, the concentration of cellulose was 35%, water density was set to 806 kg/m$^3$, rapid heating was carried out until temperature reached 319; heating rate was 11.1 until temperature reached 317 (103 MPa), and cellulose was dissolved completely in 2 s. Cellulose was hydrolyzed into oligosaccharides.

EXAMPLE 3

Pure Water

Example 1 was repeated, except that: pure water was heated up to 326; after mixed, the concentration of cellulose was 26%, water density was set to 995 kg/m$^3$, rapid heating was carried out until temperature reached 326; heating rate was 9.6/s until temperature reached 318 (539 MPa), and cellulose was dissolved completely in 1.7 s. Cellulose was hydrolyzed into oligosaccharides.

EXAMPLE 4

$10^{-6}$ M HCl

Cellulose was added to an acidic aqueous solution ($10^{-6}$ M HCl) to form a cellulose material, and the acidic aqueous solution ($10^{-6}$ M HCl) was heated up to 338. The acidic aqueous solution and the cellulose material were mixed and placed into a reactor. After mixed, the concentration of cellulose was 28%, water density was set to 995 kg/m$^3$, rapid heating was carried out until temperature reached 338; heating rate was 12 /s until temperature reached 337 (581 MPa), and cellulose was dissolved completely in 0.9 s. Heating was continued until temperature reached 355. Cellulose was hydrolyzed into oligosaccharides and glucose.

EXAMPLE 5

$10^{-6}$ M HCl

Example 4 was repeated, except that: the acidic aqueous solution was heated up to 331; after mixed, the concentration of cellulose was 7.5%, water density was set to 814 kg/m$^3$, rapid heating was carried out until temperature reached 331; heating rate was 12.5/s until temperature reached 327 (127 MPa), and cellulose was dissolved completely in 1.1 s. Heating was continued until temperature reached 355. Cellulose was hydrolyzed into oligosaccharides and glucose.

EXAMPLE 6

$10^{-6}$ M HCl

Example 4 was repeated, except that: the acidic aqueous solution was heated up to 336; after mixed, the concentration of cellulose was 18%, water density was set to 682 kg/m$^3$, rapid heating was carried out until temperature reached 336; heating rate was 11/s until temperature reached 333 (28 MPa), and cellulose was dissolved completely in 1.1 s. Heating was continued until temperature reached 355. Cellulose was hydrolyzed into oligosaccharides and glucose.

EXAMPLE 7

$10^{-5}$ M HCl

Cellulose was added to an acidic aqueous solution ($10^{-5}$ M HCl) to form a cellulose material, and the acidic aqueous solution ($10^{-5}$ M HCl) was heated up to 339. The acidic aqueous solution and the cellulose material were mixed and placed into a reactor. After mixed, the concentration of cellulose was 33%, water density was set to 992 kg/m$^3$, rapid heating was carried out until temperature reached 339; heating rate was 11.6/s until temperature reached 335 (565 MPa), and cellulose was dissolved completely in 0.85 s. Heating was continued until temperature reached 355. Cellulose was hydrolyzed into oligosaccharides and glucose.

EXAMPLE 8

$10^{-5}$ M HCl

Example 7 was repeated, except that: the acidic aqueous solution was heated up to 313; after mixed, the concentration of cellulose was 23.4%, water density was set to 754 kg/m$^3$, rapid heating was carried out until temperature reached 313; heating rate was 11.7/s until temperature reached 308 (42 MPa), and cellulose was dissolved completely in 1.95 s. Heating was continued until temperature reached 355. Cellulose was hydrolyzed into oligosaccharides.

EXAMPLE 9

$10^{-5}$ M HCl

Example 7 was repeated, except that: the acidic aqueous solution was heated up to 337; after mixed, the concentration of cellulose was 13.4%, water density was set to 726 kg/m$^3$, rapid heating was carried out until temperature reached 337; heating rate was 10.2/s until temperature reached 326 (43 MPa), and cellulose was dissolved completely in 1.11 s. Heating was continued until temperature reached 355. Cellulose was hydrolyzed into oligosaccharides and glucose.

EXAMPLE 10

$10^{-4}$ M HNO$_3$

Cellulose was added to an acidic aqueous solution ($10^{-4}$ M HNO$_3$) to form a cellulose material, and the acidic aqueous solution ($10^{-4}$ M HNO$_3$) was heated up to 337. The acidic aqueous solution and the cellulose material were mixed and placed into a reactor. After mixed, the concentration of cellulose was 34%, water density was set to 995 kg/m$^3$, rapid heating was carried out until temperature reached 337; heating rate was 12.6/s until temperature reached 332 (570 MPa), and cellulose was dissolved completely in 1.44 s. Heating was continued until temperature reached 355. Cellulose was hydrolyzed into oligosaccharides and glucose.

EXAMPLE 11

$10^{-4}$ M HNO$_3$

Example 10 was repeated, except that: the acidic aqueous solution was heated up to 324; after mixed, the concentration of cellulose was 27%, water density was set to 890 kg/m$^3$, rapid heating was carried out until temperature reached 324; heating rate was 12.6/s until temperature reached 324 (251 MPa), and cellulose was dissolved completely in 1.65 s. Heating was continued until temperature reached 355. Cellulose was hydrolyzed into oligosaccharides and glucose.

EXAMPLE 12

$10^{-4}$ M HNO$_3$

Example 10 was repeated, except that: the acidic aqueous solution was heated up to 346; after mixed, the concentration of cellulose was 27.3%, water density was set to 774 kg/m$^3$, rapid heating was carried out until temperature reached 346; heating rate was 12.7/s until temperature reached 346 (106 MPa), and cellulose was dissolved completely in 1.55 s. Heating was continued until temperature reached 355. Cellulose was hydrolyzed into oligosaccharides and glucose.

EXAMPLE 13

$10^{-3}$ M [H$^+$] in H$_2$SO$_4$

Cellulose was added to an acidic aqueous solution ($10^{-3}$ M H$_2$SO$_4$) to form a cellulose material, and the acidic aqueous solution ($10^{-3}$ M H$_2$SO$_4$) was heated up to 337. The acidic aqueous solution and the cellulose material were mixed and placed into a reactor. After mixed, the concentration of cellulose was 19.6%, water density was set to 990 kg/m$^3$, rapid heating was carried out until temperature reached 337; heating rate was 11.7/s until temperature reached 334 (556 MPa), and cellulose was dissolved completely in 1.54 s. Heating was continued until temperature reached 355. Cellulose was hydrolyzed into oligosaccharides and glucose.

EXAMPLE 14

$10^{-3}$ M [H$^+$] in H$_2$SO$_4$

Example 13 was repeated, except that: the acidic aqueous solution was heated up to 322; after mixed, the concentration of cellulose was 12%, water density was set to 818 kg/m$^3$, rapid heating was carried out until temperature reached 322; heating rate was 10.9/s until temperature reached 311 (109 MPa), and cellulose was dissolved completely in 1.22 s. Heating was continued until temperature reached 355. Cellulose was hydrolyzed into oligosaccharides and glucose.

EXAMPLE 15

$10^{-3}$ M [H$^+$] in H$_2$SO$_4$

Example 13 was repeated, except that: the acidic aqueous solution was heated up to 335; after mixed, the concentration of cellulose was 35%, water density was set to 636 kg/m$^3$, rapid heating was carried out until temperature reached 335; heating rate was 9.7/s until temperature reached 335 (16 MPa), and cellulose was dissolved completely in 1.67 s. Heating was continued until temperature reached 355. Cellulose was hydrolyzed into oligosaccharides and glucose.

EXAMPLE 16

$10^{-2}$ M HCl

Cellulose was added to an acidic aqueous solution ($10^{-2}$ M HCl) to form a cellulose material, and the acidic aqueous solution ($10^{-2}$ M HCl) was heated up to 334. The acidic aqueous solution and the cellulose material were mixed and placed into a reactor. After mixed, the concentration of cellulose was 0.5%, water density was set to 993 kg/m$^3$, rapid heating was carried out until temperature reached 334; heating rate was 13.4/s until temperature reached 329 (556 MPa), and cellulose was dissolved completely in 1.25 s. Heating was continued until temperature reached 355. Cellulose was hydrolyzed into oligosaccharides and glucose.

EXAMPLE 17

$10^{-2}$ M HCl

Example 16 was repeated, except that: the acidic aqueous solution was heated up to 314; after mixed, the concentration of cellulose was 10.5%, water density was set to 810 kg/m$^3$, rapid heating was carried out until temperature reached 314; heating rate was 12.5/s until temperature reached 310 (98 MPa), and cellulose was dissolved completely in 1.2 s. Heating was continued until temperature reached 355. Cellulose was hydrolyzed into oligosaccharides and glucose.

EXAMPLE 18

$10^{-2}$ M HCl

Example 16 was repeated, except that: the acidic aqueous solution was heated up to 333; after mixed, the concentration of cellulose was 23%, water density was set to 670 kg/m³, rapid heating was carried out until temperature reached 333; heating rate was 11.8/s until temperature reached 321 (13 MPa), and cellulose was dissolved completely in 1.6 s. Heating was continued until temperature reached 355. Cellulose was hydrolyzed into oligosaccharides and glucose.

EXAMPLE 19

0.1 M HCl

Cellulose was added to an acidic aqueous solution (0.1 M HCl) to form a cellulose material, and the acidic aqueous solution (0.1 M HCl) was heated up to 309. The acidic aqueous solution and the cellulose material were mixed and placed into a reactor. After mixed, the concentration of cellulose was 1.5%, water density was set to 995 kg/m³, rapid heating was carried out until temperature reached 309; heating rate was 9.7/s until temperature reached 300 (499 MPa), and cellulose was dissolved completely in 1.15 s. Heating was continued until temperature reached 355. Cellulose was hydrolyzed into oligosaccharides and glucose.

EXAMPLE 20

0.1 M HCl

Example 19 was repeated, except that: the acidic aqueous solution was heated up to 284; after mixed, the concentration of cellulose was 31%, water density was set to 782 kg/m³, rapid heating was carried out until temperature reached 284; heating rate was 9.9/s until temperature reached 277 (25 MPa), and cellulose was dissolved completely in 0.9 s. Heating was continued until temperature reached 355. Cellulose was hydrolyzed into oligosaccharides and glucose.

EXAMPLE 21

0.1 M HCl

Example 19 was repeated, except that: the acidic aqueous solution was heated up to 348; after mixed, the concentration of cellulose was 7%, water density was set to 611 kg/m³, rapid heating was carried out until temperature reached 348; heating rate was 10.7/s until temperature reached 286 (7 MPa), and cellulose was dissolved completely in 1.3 s. Heating was continued until temperature reached 355. Cellulose was hydrolyzed into oligosaccharides and glucose.

EXAMPLE 22

1 M HCl

Cellulose was added to an acidic aqueous solution (1 M HCl) to form a cellulose material, and the acidic aqueous solution (1 M HCl) was heated up to 283. The acidic aqueous solution and the cellulose material were mixed and placed into a reactor. After mixed, the concentration of cellulose was 5.5%, water density was set to 991 kg/m³, rapid heating was carried out until temperature reached 283; heating rate was 9.5/s until temperature reached 272 (424 MPa), and cellulose was dissolved completely in 1.2 s. Heating was continued until temperature reached 355. Cellulose was hydrolyzed into oligosaccharides and glucose in 5 s.

EXAMPLE 23

1 M HCl

Example 22 was repeated, except that: the acidic aqueous solution was heated up to 276; after mixed, the concentration of cellulose was 31.5%, water density was set to 942 kg/m³, rapid heating was carried out until temperature reached 276; heating rate was 11.7/s until temperature reached 261 (256 MPa), and cellulose was dissolved completely in 1.34 s. Heating was continued until temperature reached 355. Cellulose was hydrolyzed into oligosaccharides and glucose.

EXAMPLE 24

1 M HCl

Example 22 was repeated, except that: the acidic aqueous solution was heated up to 277; after mixed, the concentration of cellulose was 31.5%, water density was set to 751 kg/m³, rapid heating was carried out until temperature reached 277; heating rate was 10.1/s until temperature reached 273 (6 MPa), and cellulose was dissolved completely in 1.3 s. Heating was continued until temperature reached 355. Cellulose was hydrolyzed into oligosaccharides and glucose.

EXAMPLE 25

$10^{-6}$ M NaOH

Cellulose was added to an alkaline aqueous solution ($10^{-6}$ M NaOH) to form a cellulose material, and the alkaline aqueous solution ($10^{-6}$ M NaOH) was heated up to 329. The alkaline aqueous solution and the cellulose material were mixed and placed into a reactor. After mixed, the concentration of cellulose was 32.5%, water density was set to 665 kg/m³, rapid heating was carried out until temperature reached 329; heating rate was 9.5/s until temperature reached 329 (18 MPa), and cellulose was dissolved completely in 1.14 s. Heating was continued until temperature reached 355. Cellulose was hydrolyzed into oligosaccharides and glucose.

EXAMPLE 26

$10^{-6}$ M NaOH

Example 25 was repeated, except that: the alkaline aqueous solution was heated up to 326; after mixed, the concentration of cellulose was 28.5%, water density was set to 802 kg/m3, rapid heating was carried out until temperature reached 326; heating rate was 9.7/s until temperature reached 318 (100 MPa), and cellulose was dissolved completely in 2 s. Heating was continued until temperature reached 355. Cellulose was hydrolyzed into oligosaccharides and glucose.

EXAMPLE 27

$10^{-6}$ M NaOH

Example 25 was repeated, except that: the alkaline aqueous solution was heated up to 330; after mixed, the concentration of cellulose was 21.5%, water density was set to 997 kg/m3, rapid heating was carried out until temperature reached 330; heating rate was 9.2/s until temperature reached 327 (566

MPa), and cellulose was dissolved completely in 1.85 s. Heating was continued until temperature reached 355. Cellulose was hydrolyzed into oligosaccharides and glucose.

EXAMPLE 28

$10^{-5}$ M KOH

Cellulose was added to an alkaline aqueous solution ($10^{-5}$ M KOH) to form a cellulose material, and the alkaline aqueous solution ($10^{-5}$ M KOH) was heated up to 343. The alkaline aqueous solution and the cellulose material were mixed and placed into a reactor. After mixed, the concentration of cellulose was 7%, water density was set to 621 kg/m$^3$, rapid heating was carried out until temperature reached 343; heating rate was 11/s until temperature reached 319 (11 MPa), and cellulose was dissolved completely in 1.1 s. Heating was continued until temperature reached 355. Cellulose was hydrolyzed into oligosaccharides and glucose.

EXAMPLE 29

$10^{-5}$ M KOH

Example 28 was repeated, except that: the alkaline aqueous solution was heated up to 320; after mixed, the concentration of cellulose was 23%, water density was set to 808 kg/m$^3$, rapid heating was carried out until temperature reached 320; heating rate was 11.8/s until temperature reached 318 (107 MPa), and cellulose was dissolved completely in 1.8 s. Heating was continued until temperature reached 355. Cellulose was hydrolyzed into oligosaccharides and glucose.

EXAMPLE 30

$10^{-5}$ M KOH

Example 28 was repeated, except that: the alkaline aqueous solution was heated up to 339; after mixed, the concentration of cellulose was 10%, water density was set to 971 kg/m$^3$, rapid heating was carried out until temperature reached 339; heating rate was 12.4/s until temperature reached 327 (475 MPa), and cellulose was dissolved completely in 1 s. Heating was continued until temperature reached 355. Cellulose was hydrolyzed into oligosaccharides and glucose.

EXAMPLE 31

$10^{-4}$ M [OH$^-$] in Ca(OH)$_2$

Cellulose was added to an alkaline aqueous solution ($10^{-4}$ M Ca(OH)$_2$) to form a cellulose material, and the alkaline aqueous solution ($10^{-4}$ M Ca(OH)$_2$) was heated up to 352. The alkaline aqueous solution and the cellulose material were mixed and placed into a reactor. After mixed, the concentration of cellulose was 32%, water density was set to 587 kg/m$^3$, rapid heating was carried out until temperature reached 352; heating rate was 8.8 /s until temperature reached 343 (40 MPa), and cellulose was dissolved completely in 1.6 s. Heating was continued until temperature reached 355. Cellulose was hydrolyzed into oligosaccharides and glucose.

EXAMPLE 32

$10^{-4}$ M [OH$^-$] in Ca(OH)$_2$

Example 31 was repeated, except that: the alkaline aqueous solution was heated up to 321; after mixed, the concentration of cellulose was 13%, water density was set to 886 kg/m$^3$, rapid heating was carried out until temperature reached 321; heating rate was 7.8/s until temperature reached 315 (227 MPa), and cellulose was dissolved completely in 1.4 s. Heating was continued until temperature reached 355. Cellulose was hydrolyzed into oligosaccharides and glucose.

EXAMPLE 33

$10^{-4}$ M [OH$^-$] in Ca(OH)$_2$

Example 31 was repeated, except that: the alkaline aqueous solution was heated up to 332; after mixed, the concentration of cellulose was 26%, water density was set to 997 kg/m$^3$, rapid heating was carried out until temperature reached 332; heating rate was 8.4/s until temperature reached 325 (562 MPa), and cellulose was dissolved completely in 1.66 s. Heating was continued until temperature reached 355. Cellulose was hydrolyzed into oligosaccharides and glucose.

EXAMPLE 34

$10^{-3}$ M NaOH

Cellulose was added to an alkaline aqueous solution ($10^{-3}$ M NaOH) to form a cellulose material, and the alkaline aqueous solution ($10^{-3}$ M NaOH) was heated up to 350. The alkaline aqueous solution and the cellulose material were mixed and placed into a reactor. After mixed, the concentration of cellulose was 12%, water density was set to 708 kg/m$^3$, rapid heating was carried out until temperature reached 350; heating rate was 13.1/s until temperature reached 337 (45 MPa), and cellulose was dissolved completely in 1.7 s. Heating was continued until temperature reached 355. Cellulose was hydrolyzed into oligosaccharides and glucose.

EXAMPLE 35

$10^{-3}$ M NaOH

Example 34 was repeated, except that: the alkaline aqueous solution was heated up to 321; after mixed, the concentration of cellulose was 29%, water density was set to 848 kg/m$^3$, rapid heating was carried out until temperature reached 321; heating rate was 13.4/s until temperature reached 311 (152 MPa), and cellulose was dissolved completely in 1.88 s. Heating was continued until temperature reached 355. Cellulose was hydrolyzed into oligosaccharides and glucose.

EXAMPLE 36

$10^{-3}$ M NaOH

Example 34 was repeated, except that: the alkaline aqueous solution was heated up to 337; after mixed, the concentration of cellulose was 0.1%, water density was set to 996 kg/m$^3$, rapid heating was carried out until temperature reached 337; heating rate was 13.7/s until temperature reached 331 (571 MPa), and cellulose was dissolved completely in 1.3 s. Heating was continued until temperature reached 355. Cellulose was hydrolyzed into oligosaccharides and glucose.

EXAMPLE 37

$10^{-2}$ M NaOH

Cellulose was added to an alkaline aqueous solution ($10^{-2}$ M NaOH) to form a cellulose material, and the alkaline aqueous solution ($10^{-2}$ M NaOH) was heated up to 352. The alkaline aqueous solution and the cellulose material were mixed and placed into a reactor. After mixed, the concentration of cellulose was 1%, water density was set to 636 kg/m³, rapid heating was carried out until temperature reached 352; heating rate was 10.8/s until temperature reached 352 (29 MPa), and cellulose was dissolved completely in 1.21 s. Heating was continued until temperature reached 355. Cellulose was hydrolyzed into oligosaccharides and glucose.

EXAMPLE 38

$10^{-2}$ M NaOH

Example 37 was repeated, except that: the alkaline aqueous solution was heated up to 331; after mixed, the concentration of cellulose was 8%, water density was set to 954 kg/m³, rapid heating was carried out until temperature reached 331; heating rate was 9.1/s until temperature reached 320 (407 MPa), and cellulose was dissolved completely in 1.4 s. Heating was continued until temperature reached 355. Cellulose was hydrolyzed into oligosaccharides and glucose.

EXAMPLE 39

$10^{-2}$ M NaOH

Example 37 was repeated, except that: the alkaline aqueous solution was heated up to 335; after mixed, the concentration of cellulose was 32%, water density was set to 993 kg/m³, rapid heating was carried out until temperature reached 335; heating rate was 9.8/s until temperature reached 330 (558 MPa), and cellulose was dissolved completely in 1.9 s. Heating was continued until temperature reached 355. Cellulose was hydrolyzed into oligosaccharides and glucose.

EXAMPLE 40

0.1 M NaOH

Cellulose was added to an alkaline aqueous solution (0.1 M NaOH) to form a cellulose material, and the alkaline aqueous solution (0.1 M NaOH) was heated up to 346. The alkaline aqueous solution and the cellulose material were mixed and placed into a reactor. After mixed, the concentration of cellulose was 32%, water density was set to 655 kg/m³, rapid heating was carried out until temperature reached 346; heating rate was 11.8/s until temperature reached 339 (24 MPa), and cellulose was dissolved completely in 1.41 s. Heating was continued until temperature reached 355. Cellulose was hydrolyzed into oligosaccharides and glucose.

EXAMPLE 41

0.1 M NaOH

Example 40 was repeated, except that: the alkaline aqueous solution was heated up to 352; after mixed, the concentration of cellulose was 23.9%, water density was set to 980 kg/m³, rapid heating was carried out until temperature reached 352; heating rate was 13.8/s until temperature reached 344 (541 MPa), and cellulose was dissolved completely in 1.23 s. Heating was continued until temperature reached 355. Cellulose was hydrolyzed into oligosaccharides and glucose in 5 s.

EXAMPLE 42

0.1 M NaOH

Example 40 was repeated, except that: the alkaline aqueous solution was heated up to 350; after mixed, the concentration of cellulose was 31.5%, water density was set to 997 kg/m³, rapid heating was carried out until temperature reached 350; heating rate was 12.7/s until temperature reached 335 (584 MPa), and cellulose was dissolved completely in 1.55 s. Heating was continued until temperature reached 355. Cellulose was hydrolyzed into oligosaccharides and glucose in 5 s.

EXAMPLE 43

1 M NaOH

Cellulose was added to an alkaline aqueous solution (1 M NaOH) to form a cellulose material, and the alkaline aqueous solution (1 M NaOH) was heated up to 335. The alkaline aqueous solution and the cellulose material were mixed and placed into a reactor. After mixed, the concentration of cellulose was 29%, water density was set to 726 kg/m³, rapid heating was carried out until temperature reached 335; heating rate was 9.8/s until temperature reached 325 (42 MPa), and cellulose was dissolved completely in 1.76 s. Heating was continued until temperature reached 355. Cellulose was hydrolyzed into oligosaccharides and glucose.

EXAMPLE 44

1 M NaOH

Example 43 was repeated, except that: the alkaline aqueous solution was heated up to 279; after mixed, the concentration of cellulose was 26.5%, water density was set to 818 kg/m³, rapid heating was carried out until temperature reached 279; heating rate was 10.7/s until temperature reached 274 (56 MPa), and cellulose was dissolved completely in 1.33 s. Heating was continued until temperature reached 355. Cellulose was hydrolyzed into oligosaccharides and glucose.

EXAMPLE 45

1 M NaOH

Example 43 was repeated, except that: the alkaline aqueous solution was heated up to 330; after mixed, the concentration of cellulose was 29.5%, water density was set to 996 kg/m³, rapid heating was carried out until temperature reached 330; heating rate was 10.2/s until temperature reached 321 (549 MPa), and cellulose was dissolved completely in 1.53 s. Heating was continued until temperature reached 355. Cellulose was hydrolyzed into oligosaccharides and glucose in 5 s.

EXAMPLE 46

Figure 6:
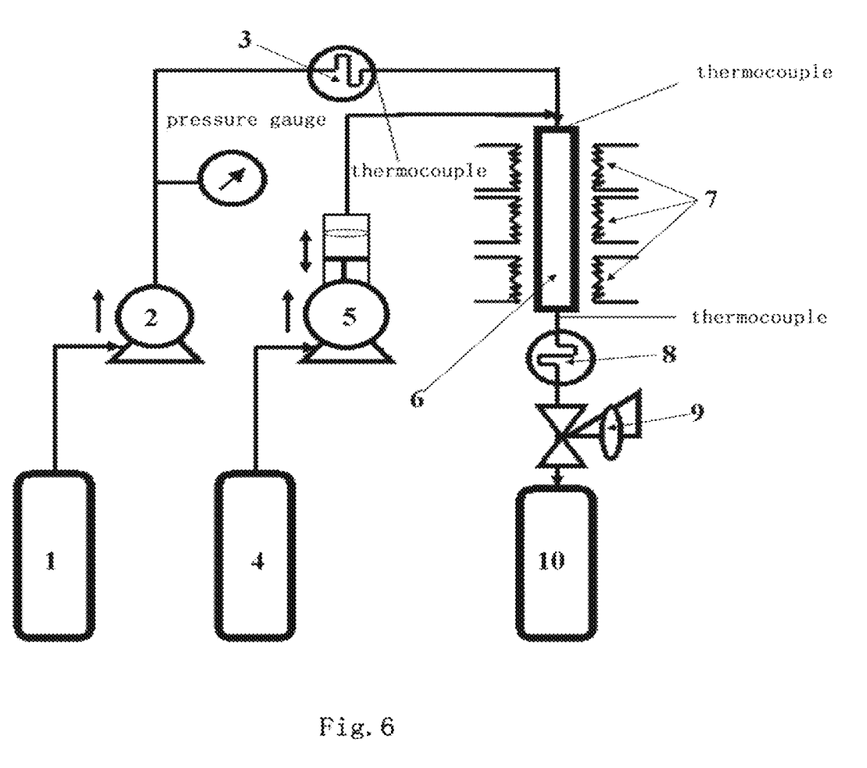
FIG. 6. The schematic diagram showing the connections of the equipment used in the invention.

An device for completely dissolving and rapidly hydrolyzing cellulose is shown in FIG. 6. An acidic (or alkaline) solution container 1 is connected to a feed port of a tubular reactor 6 via a high-pressure pump 2, and a preheater 3 is located between the high-pressure pump and the feed port of the tubular reactor. A cellulose material container 4 is connected to an acidic (or alkaline) aqueous pipe at the feed port of the tubular reactor 6 via a high-pressure slurry pump 5. An electronic heating oven 7 is provided outside the tubular reactor 6. A container 10 for the products is connected to a discharge port of the tubular reactor 6 via a pressure-regulating valve 9 and a cooler 8.

The working principle of this continuous flow device is shown as follows. The solution in the acidic (or alkaline) aqueous solution container 1 is preheated to 261~352 (6~584 MPa) by the preheater 3, and pressed into the tubular reactor 6 by the high-pressure pump 2. Cellulose and an acidic (or alkaline) aqueous solution are mixed in a cellulose material container 4, then mixed with the preheated acidic (or alkaline) aqueous solution before pumped to the feed port of the tubular reactor by the high-pressure slurry pump 5. The resulting mixture enters the tubular reactor 6 immediately and is heated rapidly up to 355. Cellulose is dissolved completely and homogeneously hydrolyzed in the reactor. The completely hydrolyzed products are transported through the discharge port of the reactor into the container 10 for products. Cooling rate is under the control of the cooler 8, and the reaction pressure is controlled by the pressure-regulating valve 9.

The reactions, including reaction time, pressure, temperature, flowrate, etc. of the solubilzed cellulose can be controlled conveniently with this continuous flow device. This device mainly finds following applications:

(1) Pretreating cellulose

When solubilized cellulose is further heated up to <355 and kept for 0~2 s, the structure of the cellulose in a homogeneous condition is broken down. After such pretreatment, the oligosaccharides and sugars therein can be used for producing ethanol and other bioproducts through fermentation by means of bioconversion (such as, for producing antibiotics, lysine, lactic acid and sodium glutamate, etc. through fermentation).

(2) Completely hydrolyzing cellulose into saccharides

When solubilized cellulose is heated up to 355 and kept for 5 s, the cellulose is homogeneously hydrolyzed into glucose and oligosaccharides. These saccharides not only can be used for producing ethanol, but also can be used, by means of bioconversion, for producing biofuels and bioproducts.

(3) Continuously producing gaseous fuel, liquid fuel or chemicals

The rear section of the tubular reactor is filled with catalyst, thus when cellulose is dissolved completely, it enters the rear section and undergoes a homogeneous catalytic reaction. Because solubilized cellulose is easier to reach the active sites of catalysts, its reaction is easier to ocurr. The solubilized cellulose catalytically or non-catalytically reacts in a liquid-phase hot water, and homogeneously produces gaseous fuel (e.g., $H_2$ with Ni catalyst) and liquid fuel (e.g., hydrocarbons with Pt catalyst) and synthesizes chemicals (e.g., 5-hydroxymethyl furfural or furfural, alcohols with Pt/—$Al_2O_3$ catalyst) and foods.

The invention claimed is:

1. A method for completely dissolving and rapidly hydrolyzing cellulose, comprising the steps of:
   (1) placing cellulose in an acidic aqueous solution with a $[H^+]$ concentration of $10^{-7}$~1M or an alkaline aqueous solution with a $[OH^-]$ concentration of $10^{-7}$~1 M, as sample A, wherein the volume ratio of solid to liquid is (0.003~1.05):1;
   (2) heating the acidic aqueous solution with a $[H^+]$ concentration of $10^{-7}$~1 M or an alkaline aqueous solution with a $[OH^-]$ concentration of $10^{-7}$~1 M up to 261~352° C. as sample B;
   (3) mixing sample A and sample B obtained from step 1 and step 2 in a reactor to a concentration of cellulose of 0.1%~35%, adjusting the concentration of the mixed solution to an acidity of $10^{-7}$~1 M $[H^+]$ or an alkalinity of $10^{-7}$~1 M $[OH^-]$, and a water density of 587 997 kg/m$^3$, setting pressure at 6~584 MPa, rapidly heated the mixture up to 261~352° C. at a heating rate of 7.8~14.8° C./s, and then completely dissolving cellulose in 0.8~2 sec and hydrolyzing cellulose in 5 sec.

2. The method for completely dissolving and rapidly hydrolyzing cellulose according to claim 1, wherein said acidic aqueous solution is one of hydrochloric acid, nitric acid and sulphuric acid aqueous solutions.

3. The method for completely dissolving and rapidly hydrolyzing cellulose according to claim 1, wherein said alkaline aqueous solution is one of sodium hydroxide, potassium hydroxide and calcium hydroxide aqueous solutions.

4. The method for completely dissolving and rapidly hydrolyzing cellulose according to claim 1, wherein said acidic aqueous solution is hydrochloric acid aqueous solution.

5. The method for completely dissolving and rapidly hydrolyzing cellulose according to claim 1, wherein said alkaline aqueous solution is sodium hydroxide aqueous solution.

6. The method for completely dissolving and rapidly hydrolyzing cellulose according to claim 1, further comprising producing ethanol, biofuels or value-added bioproducts from cellulose.

\* \* \* \* \*